US005077879A

United States Patent [19]

Haviv

[11] Patent Number: 5,077,879

[45] Date of Patent: Jan. 7, 1992

[54] HAND TOOL FOR AIDING IN THE DETACHMENT OF MEMBERS

[76] Inventor: Yehuda Haviv, 36 Nahalat Itzhak, 67448 Tel Aviv, Israel

[21] Appl. No.: 686,367

[22] Filed: Apr. 17, 1991

[51] Int. Cl.[5] .......... B23D 19/04

[52] U.S. Cl. .......... 29/268; 29/239

[58] Field of Search .......... 29/239, 267, 268, 278, 29/270

[56] References Cited

U.S. PATENT DOCUMENTS

| | | | |
|---|---|---|---|
| 1,862,326 | 6/1932 | Altice | 29/268 |
| 2,266,511 | 12/1941 | Predmore | 29/268 |
| 3,296,899 | 1/1967 | Portanova | 29/268 |
| 3,357,085 | 12/1967 | Martin | 29/268 |
| 4,236,290 | 12/1980 | McPherson | 29/239 |
| 4,571,808 | 2/1986 | King | 29/268 |

*Primary Examiner*—J. J. Hartman

*Attorney, Agent, or Firm*—Benjamin J. Barish

[57] ABSTRACT

A hand tool for aiding in the detachment of one member from another member includes a pair of lever arms pivotally mounted to each other and carrying handles at one end, and bifurcated, Y-shaped prying elements at the other end such that pressing the handles together moves the prying elements apart. A spring normally urges the handles apart and thereby the prying elements together.

6 Claims, 1 Drawing Sheet

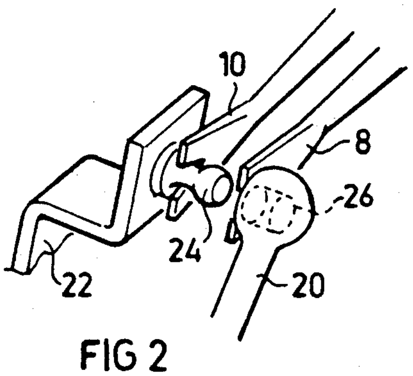
FIG 2
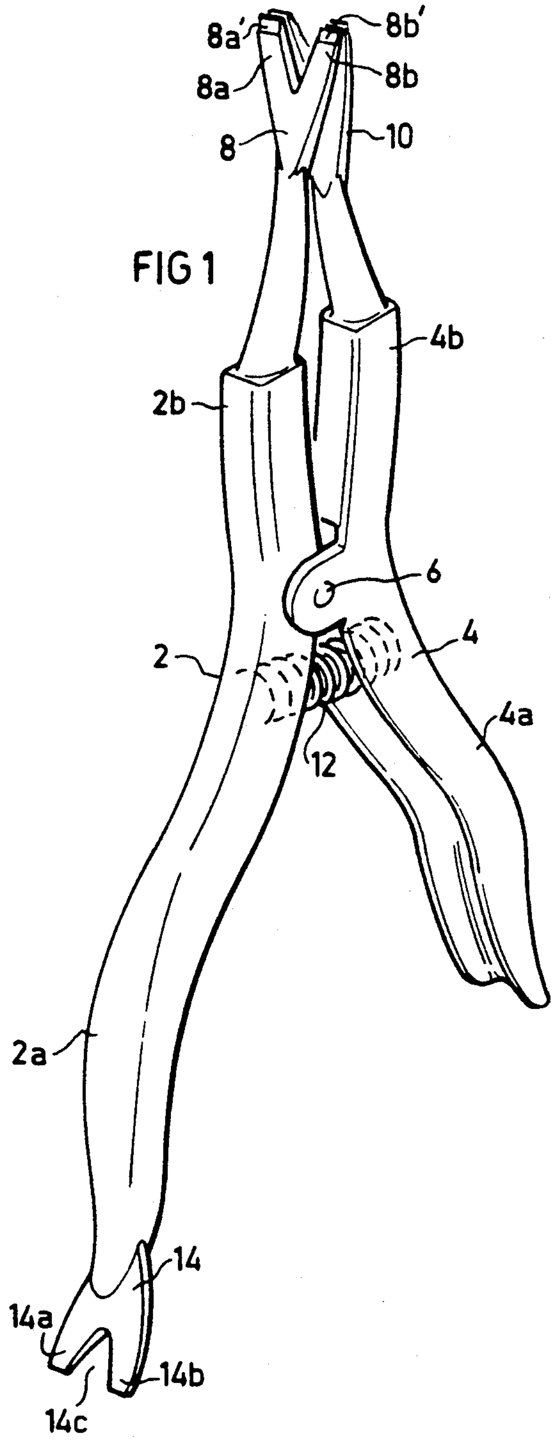
FIG 1
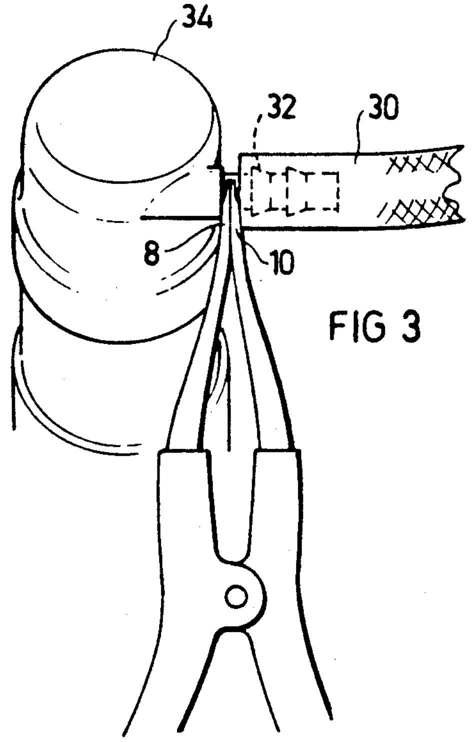
FIG 3
FIG 4
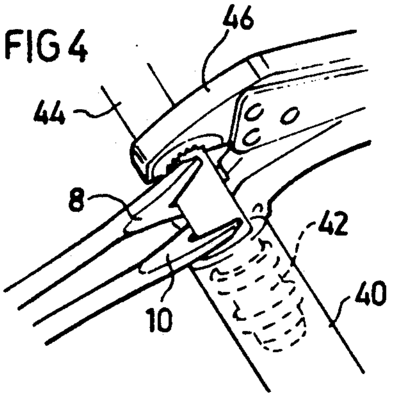
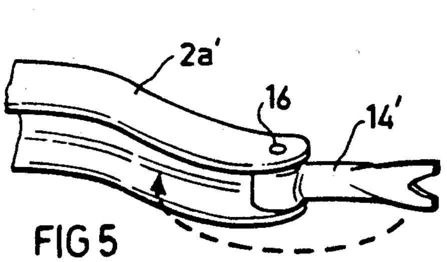
FIG 5

HAND TOOL FOR AIDING IN THE DETACHMENT OF MEMBERS

FIELD AND BACKGROUND OF THE INVENTION

The present invention relates to hand tools, and particularly to a hand tool for aiding in the detachment of one member from another member.

The need frequently arises to detach one member from another member, such as to detach a tube from a nipple, or an arm from a pin. Frequently, this is done by inserting a screwdriver blade, or other form of prying element, between the two members and then apply leverage in order to force one from the other. However, such a manner of forcibly detaching one member from the other is frequently not convenient, and moreover requires a fulcrum for the lever which is not always present.

OBJECTS AND SUMMARY OF THE INVENTION

An object of the present invention is to provide a hand tool particularly useful for aiding in the detachment of one member from another member, such as for detaching a tube from a nipple, or a lever arm from a pin.

According to the present invention, there is provided a hand tool for aiding in the detachment of one member from another member, comprising: a pair of lever arms pivotally mounted to each other and carrying handles at one end, and prying elements at the other end, such that pressing the handles together move the prying elements apart; each of the prying elements having bifurcated tips to enable them, while together, to be inserted between the two members and then forced apart by pressing the two handles together.

According to further features in the described preferred embodiment, the bifurcated tips are flat thereby enabling them to lie flat against each other, are bevelled at their outer ends thereby enabling them more easily to be inserted between the two members, and are wider at their outer ends than at their inner ends attached to the lever arms thereby enabling them to engage larger surfaces of the two members to be detached.

More particularly, in the described preferred embodiment the bifurcated tips are of Y-configuration, and the hand tool further includes a spring for urging the handles apart and thereby the prying elements together. In addition, the end of at least one of the handles, opposite to that carrying the prying element, carries another prying element including a bifurcated tip. The latter feature has been found particularly useful where the space between the two elements to be detached is not sufficient to insert the two prying elements, but sufficient only to insert one and to use it for prying the two members apart a sufficient distance to enable the two prying elements at the other end of the hand tool to be inserted.

As will be described more particularly below, a hand tool constructed in accordance with the foregoing features has been found very useful in aiding in the detachment of tubes from nipples, lever arms from pins, and other members from each other, as will be described more particularly below.

BRIEF DESCRIPTION OF THE DRAWINGS

The invention is herein described, by way of example only, with reference to the accompanying drawings, wherein:

FIG. 1 is a three-dimensional view illustrating one form of hand tool constructed in accordance with the present invention;

FIG. 2 illustrates how the hand tool may be used for detaching a lever arm from a pin;

FIG. 3 illustrates how the hand tool may be used for detaching a tube from a nipple;

FIG. 4 illustrates how the hand tool may be used for detaching a tube from another member where the other member does not include an abutting surface for exerting the counterforce to detach the tube; and FIG. 5 illustrates a modification in the construction of the single prying tip at one end of the handle in the hand tool of FIG. 1.

DESCRIPTION OF A PREFERRED EMBODIMENT

The hand tool illustrated in FIG. 1 comprises a pair of lever arms 2, 4, pivotally mounted to each other by a pivot pin 6. The ends of the lever arms 2, 4 at one side of the pivot pin 6 are shaped to serve as handles, as shown at 2a, 4a, whereas the opposite ends 2b, 4b of the lever arms carry prying elements 8, 10. The two levers arms 2, 4 are pivotally mounted such that pressing the two handles 2a, 4a together moves the prying elements 8, 10 apart, i.e., opposite to the arrangement in a pliers or the like. A spring 12 urges the handles 2a, 4a apart, and thereby the two prying elements 8, 10 together.

Each of the two prying elements 8, 10 is of a Y-configuration, being formed with bifurcated tips, as shown at 8a, 8b, and separated by a V-shaped slot as shown at 8c. The bifurcated elements are flattened, as shown particularly in FIG. 3 to permit them to be inserted between the two members to be pried apart. To facilitate their insertion between such two members, the outer ends of the bifurcated elements are bevelled, 5as shown at 8a', 8b', FIG. 1. Also, the V-shaped slot 8c may be rounded at its inner end.

It will also be seen that each prying element 8, 10 is wider at its outer end (i.e., the end remote from the lever sections 2b, 4b) than at its inner end attached to the levers sections 2b, 4b, which thereby provides an enlarged surface of contact between the two members to be pried apart.

One of the lever arms, lever arm 2 in this case, carries a further prying element 14 at the end of its handle 2a opposite to its prying element 8. The single prying element 14 is of similar Y-configuration as the two prying elements 8, 10, being formed with bifurcations 14a, 14b separated by a V-slot 14c. The outer ends of the bifurcations 14a, 14b may also be bevelled bevel portions 8a', 8b' of prying element 8 (and of prying element 10).

The single prying element 14 is used in those cases where the space between the two members to be pried apart is not sufficient to insert the two prying elements 8, 10. Thus, the single prying element 14 may be inserted in such space and worked to pry apart the two members sufficiently to then insert the two prying elements 8, 10 at the opposite end of the hand tool.

FIG. 5 illustrates a modification wherein the single prying element 14' is pivotally mounted, by pivot pin 16, to the respective end of handle 2a', permitting the prying element to be pivoted either to an extended operative position as shown in full lines in FIG. 5, or to a retracted non-operative position nested in the space between the two sides of handle *2a'*. Instead of pivotally mounting prying element 14, it could be telescopingly mounted with respect to handle *2a*.

FIGS. 2, 3 and 4 illustrate different manners of using the hand tool of FIG. 1.

Thus, as shown in FIG. 2, the hand tool may be used for prying apart a lever arm 20 from another member 22 carrying a pin 24 received within a socket 26 of lever arm 20. Thus, the hand tool of FIG. 1, with the two prying elements 8 10 pressed together by spring 12, may be inserted between lever arm 20 and member 22, with the pin 24 received in the aligned V-shaped slots ( e.g, slot 8*c*) of the two prying elements 8, 10. Pressing together the two handles *2a*, *4a* will move the two prying elements 8, 10 apart, thereby forcibly moving lever arm 20 away from member 22.

FIG. 3 illustrates the use of the hand tool of FIG. 1 for aiding in the detachment of a tube 30 from a nipple 32 carried by a housing 34. In this case, the two prying elements 8, 10, in their normally closed conditions, are inserted to straddle the stem of the nipple 32. Pressing the two handles *2a*, *4a* together moves the two prying elements 8, 10 apart, and thereby forces the tube 30 away from the nipple 32.

FIG. 4 illustrates using the hand tool of FIG. 1 for detaching a pipe 40 from a nipple 42 at the end of a pipe 44 where there is no shoulder or stop normally present for engagement by one of the prying element (e.g., 8), as the other prying element (e.g., 10) engages the pipe 40 to be detached. In this case, a plier or wrench 46 is applied to pipe 44 to act as the stop or shoulder engageable with prying element 8, whereupon the hand tool illustrated in FIG. 1 may be used as described above for forcibly detaching pipe 40 from nipple 42 of pipe 44.

Where a rubber or soft plastic member is to be detached from another member, one of the prying elements may be forced to penetrate the rubber or soft plastic member in order to grip it when the prying elements are forced apart as described above.

It will thus be seen that the hand tool illustrated in FIG. 1 may be used in a wide variety of applications to aid in detaching one member from another member.

While the invention has been described with respect to one embodiment, it will be appreciated that this is set forth purely for purposes of example, and that many variations, modifications and other applications of the invention may be made.

What is claimed is:

1. A hand tool for aiding in the detachment of one member from another member, comprising:

a pair of lever arms pivotally mounted to each other and carrying handles at one end, and prying elements at the other end such that pressing the handles together moves the prying elements apart;

a spring for urging said handles apart and thereby said prying elements together;

each of said prying elements having bifurcated tips to enabled them to be inserted between the two members and then forced apart by pressing the two handles together;

and another prying element carried at the end of at least one of said handles opposite to that carrying said prying elements;

said latter prying tip including a bifurcated tip and being movably mounted to the respective end of the handle from an extended operative position to a retracted non-operative position nested within the handle.

2. The hand tool according to claim 1, wherein said bifurcated tips are flat to enable them to lie flat against each other when together and are formed with bevelled outer ends.

3. The hand tool according to claim 1, wherein said bifurcated tips are wider at their outer ends than at their inner ends remote from said levers attached to the levers.

4. The hand tool according to claim 1, wherein said bifurcated tips are of Y-configuration.

5. The hand tool according to claim 1, wherein said latter bifurcated tip is of Y-configuration.

6. A hand tool for aiding in the detachment of one member from another member, comprising:

a pair of lever arms pivotally mounted to each other and carrying handles at one end, and prying elements at the other end such that pressing the handles together moves the prying elements apart;

a spring for urging said handles apart and thereby said prying elements together;

each of said prying elements having bifurcated tips of a flattened Y-configuration with bevelled outer ends to enable them to be inserted between the two members and then forced apart by pressing the two handles together;

the end of one of said handles opposite to that carrying said prying element carrying another prying element including a bifurcated tip of Y-configuration;

said latter prying element being pivotally mounted to the respective end of the handle from an extended operative position to a retracted non-operative position nested within the handle.

* * * * *

UNITED STATES PATENT AND TRADEMARK OFFICE

CERTIFICATE OF CORRECTION

PATENT NO. : 5,077,879

DATED : January 7, 1992

INVENTOR(S) : Yehuda Haviv

It is certified that error appears in the above-indentified patent and that said Letters Patent is hereby corrected as shown below:

Column 4 Line 8, "enabled" should be --enable--.

Signed and Sealed this

Twenty-fifth Day of January, 1994

Attest:

Bruce Lehman

BRUCE LEHMAN

*Attesting Officer* *Commissioner of Patents and Trademarks*